United States Patent
Hayashi

(10) Patent No.: US 9,815,140 B2
(45) Date of Patent: Nov. 14, 2017

(54) POWER CONTROL METHOD FOR FIBER LASER PROCESSING MACHINE, AND FIBER LASER PROCESSING MACHINE

(71) Applicant: KOMATSU INDUSTRIES CORPORATION, Kanazawa-shi, Ishikawa (JP)

(72) Inventor: Seiichi Hayashi, Komatsu (JP)

(73) Assignee: KOMATSU INDUSTRIES CORPORATION, Kanazawa-shi, Ishikawa (JP)

( * ) Notice: Subject to any disclaimer, the term of this patent is extended or adjusted under 35 U.S.C. 154(b) by 149 days.

(21) Appl. No.: 14/767,070

(22) PCT Filed: Feb. 26, 2014

(86) PCT No.: PCT/JP2014/054714
§ 371 (c)(1),
(2) Date: Aug. 11, 2015

(87) PCT Pub. No.: WO2014/133013
PCT Pub. Date: Sep. 4, 2014

(65) Prior Publication Data
US 2015/0375337 A1    Dec. 31, 2015

(30) Foreign Application Priority Data

Feb. 27, 2013   (JP) .................................. 2013-037639

(51) Int. Cl.
*B23K 26/066*  (2014.01)
*B23K 26/38*   (2014.01)
(Continued)

(52) U.S. Cl.
CPC ...... *B23K 26/0665* (2013.01); *B23K 26/0608* (2013.01); *B23K 26/38* (2013.01); *B23K 26/40* (2013.01); *B23K 2203/04* (2013.01)

(58) Field of Classification Search
CPC ........ B23K 26/06; B23K 26/40; B23K 26/38; H04B 10/08; H04B 10/00; H04B 17/00; G01N 21/00
(Continued)

(56) References Cited

U.S. PATENT DOCUMENTS

| 8,599,892 B2* | 12/2013 | Senda ............... B23K 26/0613 372/29.021 |
|---|---|---|
| 2005/0201429 A1 | 9/2005 | Rice et al. |
| 2011/0157706 A1 | 6/2011 | Mitra et al. |
| 2012/0085740 A1* | 4/2012 | Wollmann ......... B23K 26/0604 219/121.75 |
| 2013/0299474 A1 | 11/2013 | Kashiwagi et al. |

FOREIGN PATENT DOCUMENTS

| JP | H07-273724 A | 10/1995 |
|---|---|---|
| JP | H07-328787 A | 12/1995 |

(Continued)

OTHER PUBLICATIONS

Laser Beam Quality and Processing Efficiency, thesis published in academic presentation meeting in the spring of 2006, Korea Laser Processing Society, pp. 41-46 (published on Jun. 2, 2006), the relevance being provided by the attached English-language translation of Office Action issued for corresponding Korean Patent Application No. 10-2015-7018537.

*Primary Examiner* — Samuel M Heinrich
(74) *Attorney, Agent, or Firm* — Drinker Biddle & Reath LLP

(57) ABSTRACT

There is provided a power control method for a fiber laser processing machine including: a fiber laser oscillator having a plurality of fiber laser modules each of which generates a laser beam; a laser processing head for emitting the laser beam generated from the fiber laser oscillator; and a condenser lens with a prescribed focal length provided between a workpiece and the laser processing head, for irradiating the workpiece with the laser beam having a spot diameter output from the laser processing head, wherein the number of the plurality of fiber laser modules oscillated is adjusted so as to (Continued)

achieve the spot diameter corresponding to the workpiece, and thereby, a beam quality from the laser processing head is adjusted.

10 Claims, 10 Drawing Sheets

(51) Int. Cl.
*B23K 26/40* (2014.01)
*B23K 26/06* (2014.01)
*B23K 103/04* (2006.01)

(58) Field of Classification Search
USPC ............ 219/121.61, 121.67–121.72, 121.62, 219/121.77
See application file for complete search history.

(56) References Cited

FOREIGN PATENT DOCUMENTS

| | | |
|---|---|---|
| JP | H08-206870 A | 8/1996 |
| JP | H11-254160 A | 9/1999 |
| JP | 2003-285186 A | 10/2003 |
| JP | 2004-105972 A | 4/2004 |
| JP | 3640450 B2 | 4/2005 |
| JP | 2008-044000 A | 2/2008 |
| JP | 4671697 B2 | 4/2011 |
| JP | 2011-523723 A | 8/2011 |
| JP | 2012-027241 A | 2/2012 |
| JP | 2013-541420 A | 11/2013 |
| WO | WO-2012/099116 A1 | 7/2012 |

* cited by examiner

POWER CONTROL METHOD FOR FIBER LASER PROCESSING MACHINE, AND FIBER LASER PROCESSING MACHINE

TECHNICAL FIELD

The present invention relates to a power control method for a fiber laser processing machine, and a fiber laser processing machine.

BACKGROUND ART

A fiber laser processing machine is an apparatus for performing cutting and the like of a workpiece by using a laser processing head to emit a laser beam generated from a fiber laser oscillator having a plurality of fiber laser modules which generate the laser beam (e.g., Japanese Patent Laying-Open No. 2012-27241 (PTD 1)).

CITATION LIST

Patent Document

PTD 1: Japanese Patent Laying-Open No. 2012-27241

SUMMARY OF INVENTION

Technical Problem

In the conventional fiber laser processing machine, in order to eliminate a difference in deterioration state among the fiber laser modules of the fiber laser oscillator, control was executed such that the intensity of the laser beam oscillated from each fiber laser module was kept substantially constant, i.e., such that the power of the laser beam oscillated from each fiber laser module was kept substantially constant, with respect to the requested power.

For example, in the case of a fiber laser oscillator of 2000 W on which four fiber laser modules of 500 W were mounted, the fiber laser modules were oscillated such that the power of each fiber laser module became 400 W with respect to the requested power of 1600 W, thereby obtaining the power of 1600 W.

In the case of cutting a steel plate by a laser processing machine, metal molten by irradiation of the laser beam needs to be blown away by a jet flow of an assist gas (generally, an oxygen gas is used). In order to blow away the molten material by the assist gas, a required cutting groove width (kerf width) is determined depending on a plate thickness, and as shown in FIG. 10, the cutting groove width needs to be expanded as the plate thickness becomes thicker. If the assist gas is sprayed when the cutting groove width is narrower than the required cutting groove width, the molten material is blown up on the material surface side (on the laser beam irradiation side) and the molten material cannot flow to the rear side, and thus, excellent cutting cannot be performed. Particularly when a thick plate (e.g., a plate thickness is approximately 9 mm or thicker) is cut, it is necessary to expand the cutting groove width and set an assist gas pressure at a low pressure (assist gas pressure of approximately 0.05 to 0.1 MPa).

Now, a spot diameter ω that determines the cutting groove width is expressed by the following equation (1):

$$\omega = 1.27 \cdot (\lambda \cdot f / D) \cdot M^2 \quad (1)$$

where λ represents a laser wavelength, f represents a focal length of a condenser lens, D represents a diameter of a beam incident to the condenser lens, and $M^2$ represents a value indicating the beam quality called "M square value" (hereinafter, $M^2$ value).

As is clear from the equation (1), the $M^2$ value is an index for determining spot diameter co. In the conventional fiber laser processing machine, the four fiber laser modules were constantly oscillated, and thus, the $M^2$ value of the oscillated laser beam was constantly the same. Namely, the $M^2$ value constantly showed the same value, and thus, in order to change spot diameter ω that determines the cutting groove width, it was necessary to replace the condenser lens to change focal length f of the condenser lens.

Therefore, in the conventional fiber laser processing machine, replacement of the condenser lens was necessary to change the cutting groove width depending on the plate thickness, the material and the like, and this was a cause of low workability.

Specifically, in the case of cutting a workpiece having a plate thickness of 12 mm, for example, a condenser lens of f=200 mm was used. In the case of cutting a workpiece having a plate thickness of 3.2 mm, a condenser lens of f=125 mm was used.

The present invention has been made in view of the aforementioned problem, and an object of the present invention is to provide a power control method for a fiber laser processing machine, and a fiber laser processing machine whose workability can be enhanced.

The other problem and novel feature will become apparent from the description of the present specification and the accompanying drawings.

Solution to Problem

The inventor of the present invention has made a close investigation of a use mode of a fiber laser processing machine and a deterioration state of fiber laser modules. As a result, the inventor of the present invention has found that the deterioration state of the fiber laser modules after 20000 hours (corresponding to the use for about 10 years at operation of 2000 hours a year) is not so worse than previously believed and hardly affects a workpiece to be processed. Thus, the inventor of the present invention has arrived at the present invention.

The present invention provides the following aspects.

A power control method for a fiber laser processing machine according to an aspect of the present invention is a power control method for a fiber laser processing machine including: a fiber laser oscillator having a plurality of fiber laser modules each of which generates a laser beam; a laser processing head for emitting the laser beam generated from the fiber laser oscillator; and a condenser lens with a prescribed focal length provided between a workpiece and the laser processing head, for irradiating the workpiece with the laser beam having a spot diameter output from the laser processing head. The number of the plurality of fiber laser modules oscillated is adjusted so as to achieve the spot diameter corresponding to the workpiece, and thereby, a beam quality from the laser processing head is adjusted.

According to the aspect described above, by controlling the number of the fiber laser modules, the $M^2$ value of the oscillated laser beam can be changed, and thereby, spot diameter ω can be adjusted. Therefore, the number of replacement of the condenser lens which was conventionally required can be reduced or replacement can be eliminated, and thus, the workability can be enhanced.

Preferably, as compared with the number of the fiber laser modules oscillated at the time of cutting a workpiece having a prescribed plate thickness, the number of the fiber laser modules oscillated at the time of cutting a workpiece having a plate thickness thinner than the prescribed plate thickness is set to be smaller.

According to the aspect described above, when the plate thickness is thin, the cutting groove width at which the maximum cutting speed is obtained becomes narrow. Therefore, by reducing the number of the oscillated fiber laser modules, the spot diameter can be decreased and high-precision processing can be performed.

Preferably, as compared with the number of the fiber laser modules oscillated at the time of cutting at a prescribed speed, the number of the fiber laser modules oscillated at the time of cutting at a speed higher than the prescribed speed is set to be smaller.

According to the aspect described above, when higher cutting speed is desired, the number of the oscillated fiber laser modules is reduced, and thus, even at the same power, the power density can be increased by decreasing the spot diameter. Therefore, an increase in cutting speed can be achieved and high-precision processing can be performed.

Preferably, the number of the fiber laser modules oscillated is restricted when a total laser command power is equal to or smaller than a prescribed power.

According to the aspect described above, the number of the fiber laser modules oscillated is restricted when the total laser command power is equal to or smaller than the prescribed power. Therefore, the unstable power caused by the small power of each fiber laser module can be avoided, and stable processing can be achieved.

Preferably, powers of the plurality of fiber laser modules are made different from one another.

According to the aspect described above, the degree of freedom of power setting of the fiber laser modules is enhanced.

A fiber laser processing machine according to an aspect of the present invention includes: a fiber laser oscillator having a plurality of fiber laser modules each of which generates a laser beam; a laser processing head for emitting the laser beam generated from the fiber laser oscillator; a condenser lens with a prescribed focal length provided between a workpiece and the laser processing head, for irradiating the workpiece with the laser beam having a spot diameter output from the laser processing head; and a control device capable of adjusting a beam quality from the laser processing head in accordance with the number of the plurality of fiber laser modules oscillated. The control device adjusts the number of the plurality of fiber laser modules oscillated so as to achieve the spot diameter corresponding to the workpiece.

According to the aspect described above, by controlling the number of the fiber laser modules, the $M^2$ value of the oscillated laser beam can be changed, and thereby, spot diameter ω can be adjusted. Therefore, the number of replacement of the condenser lens which was conventionally required can be reduced or replacement can be eliminated, and thus, the workability can be enhanced.

Preferably, as compared with the number of the fiber laser modules oscillated at the time of cutting a workpiece having a prescribed plate thickness, the control device sets to be smaller the number of the fiber laser modules oscillated at the time of cutting a workpiece having a plate thickness thinner than the prescribed plate thickness.

According to the aspect described above, when the plate thickness is thin, the cutting groove width at which the maximum cutting speed is obtained becomes narrow.

Therefore, by reducing the number of the oscillated fiber laser modules, the spot diameter can be decreased and high-precision processing can be performed.

Preferably, as compared with the number of the fiber laser modules oscillated at the time of cutting at a prescribed speed, the control device sets to be smaller the number of the fiber laser modules oscillated at the time of cutting at a speed higher than the prescribed speed.

According to the aspect described above, when higher cutting speed is desired, the number of the oscillated fiber laser modules is reduced, and thus, even at the same power, the power density can be increased by decreasing the spot diameter. Therefore, an increase in cutting speed can be achieved and high-precision processing can be performed.

Preferably, the control device restricts the number of the fiber laser modules oscillated, when a total laser command power is equal to or smaller than a prescribed power.

According to the aspect described above, the number of the fiber laser modules oscillated is restricted when the total laser command power is equal to or smaller than the prescribed power. Therefore, the unstable power caused by the small power of each fiber laser module can be avoided, and stable processing can be achieved.

Preferably, the control device executes control to make powers of the plurality of fiber laser modules different from one another.

According to the aspect described above, the degree of freedom of power setting of the fiber laser modules is enhanced.

Advantageous Effects of Invention

The workability of the fiber laser processing machine can be enhanced.

DESCRIPTION OF EMBODIMENTS

An embodiment of the present invention will be described hereinafter with reference to the drawings.

One embodiment of a fiber laser processing machine according to the present invention will be described in detail hereinafter with reference to the drawings.

Figure 1:
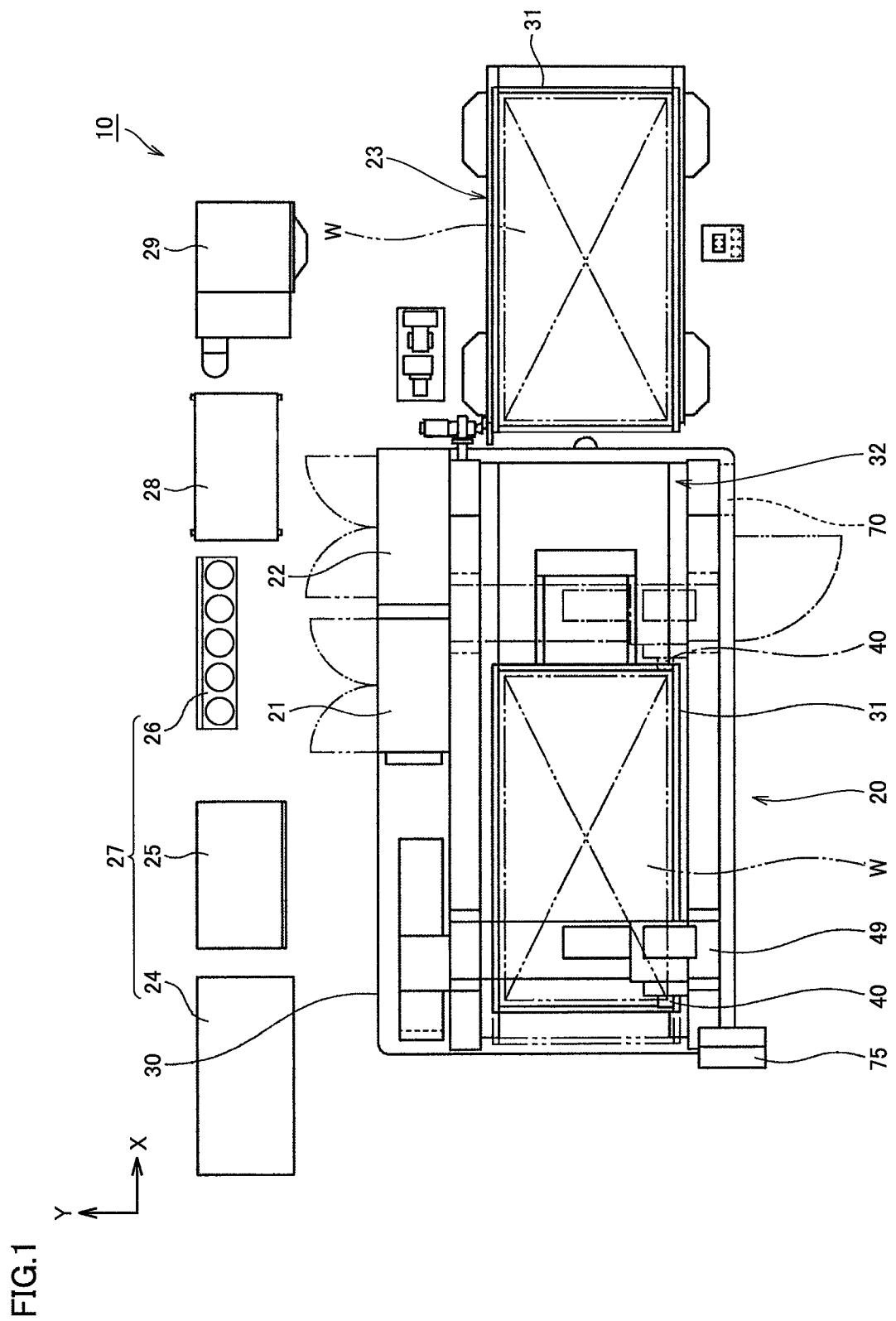
FIG. 1 is a schematic plan view of a laser processing machine according to one embodiment of the present invention.
Figure 2:
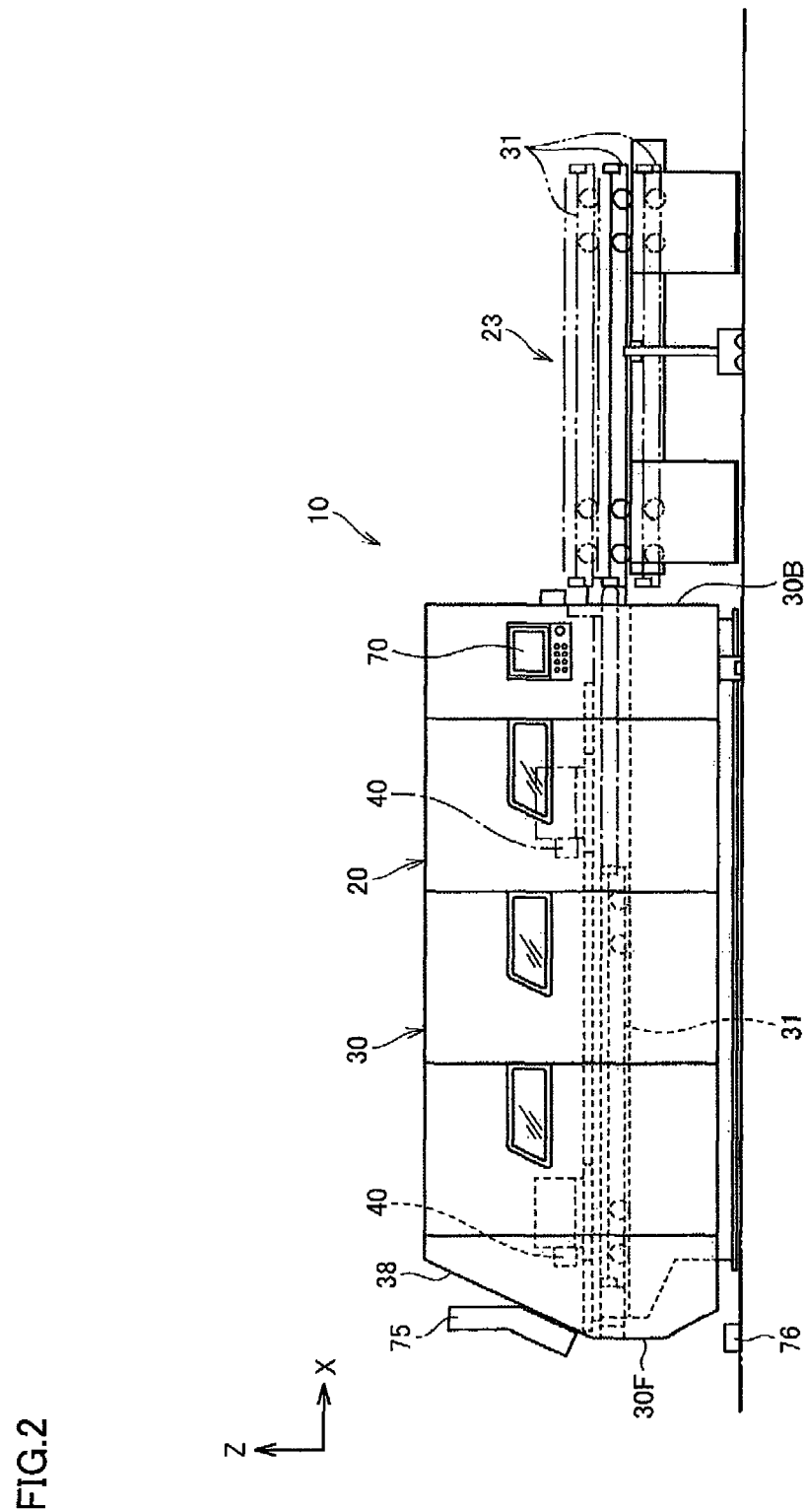
FIG. 2 is a schematic side view of the laser processing machine shown in FIG. 1.

As shown in FIGS. 1 and 2, a fiber laser processing machine 10 (hereinafter referred to as "laser processing machine") mainly includes a processing machine body 20, a fiber laser oscillator 21 (hereinafter referred to as "laser oscillator") connected to processing machine body 20 and a control device 22, a pallet changer 23 disposed to be connected to processing machine body 20, an assist gas supply portion 27 including a booster compressor 24 used to separate a nitrogen gas in the air and an air compressor 25, or an oxygen gas cylinder 26 and the like, a chiller unit 28 for supplying cooling water that cools laser oscillator 21 and a laser processing head 40 (hereinafter referred to as "processing head"), and a dust collector 29 for removing dust and the like that occur during processing.

In the present embodiment, "frontward" refers to a direction closer to processing machine body 20 in a direction of arrangement of processing machine body 20 and pallet changer 23 (in the X direction in FIGS. 1 to 3), and "rearward" refers to a direction closer to pallet changer 23 in this direction of arrangement. In addition, "leftward" and "rightward" are expressed by directions when viewing the frontward from the rearward in a direction orthogonal to the direction of arrangement (in the Y direction in FIGS. 1 and 3).

Housed in a cabin 30 that forms a part of processing machine body 20 and forms an external shape of processing machine body 20 are a pallet drive mechanism 32 for driving a pallet 31 in a prescribed direction, i.e., in a longitudinal direction (X direction) of cabin 30, processing head 40 for emitting laser beams for processing a workpiece W mounted on pallet 31, and a processing head drive mechanism 49 for driving processing head 40. Processing head 40 shown by a solid line in FIG. 1 and a dotted line in FIG. 2 indicates a state of being located at the most frontward part in the X direction (a position where pallet 31 is placed during processing), and processing head 40 shown by an alternate long and short dash line in FIGS. 1 and 2 indicates a state of being located at the most rearward part in the X direction.

Figure 5:
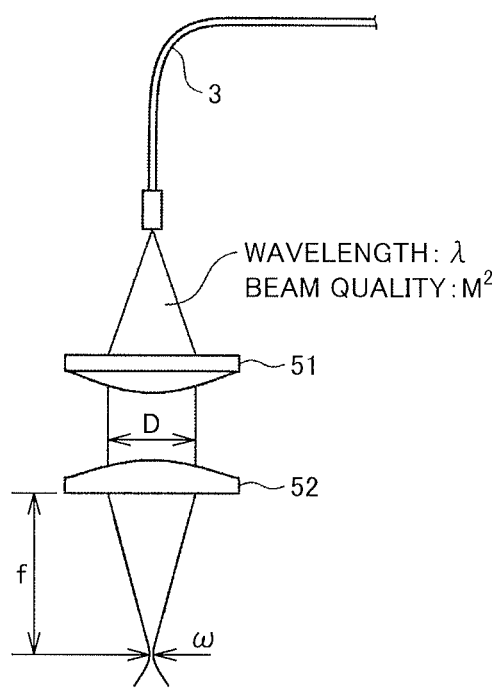
FIG. 5 is a schematic view schematically showing an external optical system.

Processing head 40 is provided in processing machine body 20 and is movable in the X direction, in a width direction (Y direction) of cabin 30, and in a vertical direction (Z direction) of cabin 30 by processing head drive mechanism 49. Referring to FIG. 5 as well, arranged in processing head 40 are a collimator lens 51 for parallelizing the laser beams emitted from an emission end of a process fiber cable 3, and a condenser lens 52 for condensing the parallelized laser beams.

Provided around processing head 40 are a cooling pipe provided from chiller unit 28, a gas supply pipe for supplying an assist gas such as a nitrogen gas or an oxygen gas from assist gas supply portion 27, and a gas supply pipe connected to a side nozzle for spraying the assist gas such as the nitrogen gas or the oxygen gas toward the neighborhood of a laser nozzle of processing head 40.

When laser oscillator 21 is actuated, the laser beams pass through process fiber cable 3 and are parallelized by collimator lens 51. Further, the parallelized laser beams enter condenser lens 52 to be condensed, and are emitted from the laser nozzle to a portion of workpiece W to be processed, and processing head 40 processes workpiece W. During processing, the assist gas supplied from assist gas supply portion 27 is injected from the laser nozzle and the side nozzle toward the portion of workpiece W to be processed, such that the molten metal generated during processing is blown away.

Figure 3:
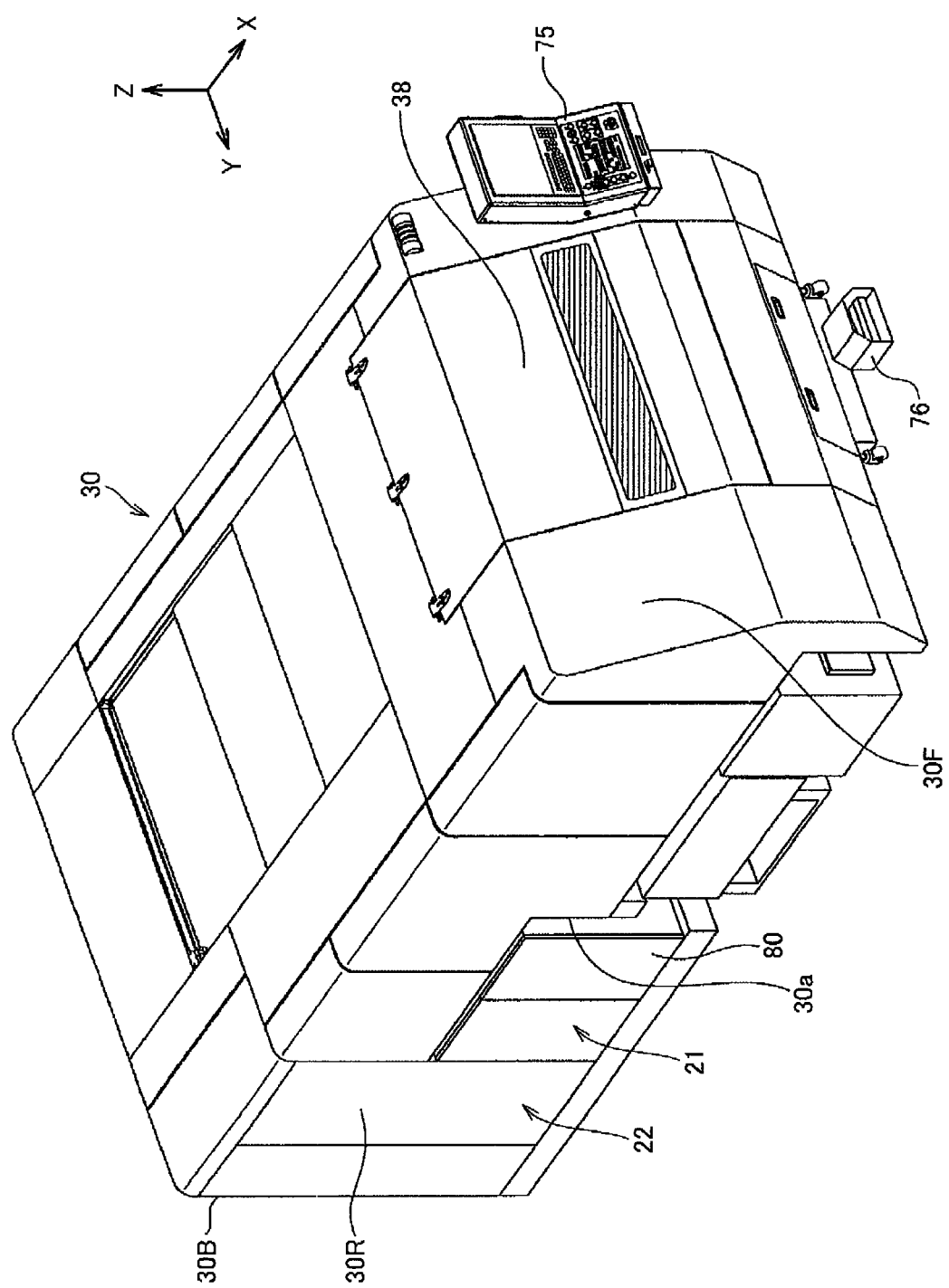
FIG. 3 is a perspective view of the right side surface side of the laser processing machine shown in FIG. 1.

As shown in FIG. 3, a gull wing 38 which is an open/close door is provided on a front surface 30F of cabin 30, and on a rear surface 30B which is the opposite side of front surface 30F, a loading/unloading port (not shown) formed in the shape of a horizontally long slit is provided to correspond to pallet changer 23. Pallet changer 23 is arranged to face rear surface 30B of cabin 30 having the loading/unloading port, and two pallets 31 can be arranged vertically in two stages in pallet changer 23. At the time of processing of large-lot products, pallet 31 having workpiece W placed thereon is loaded/unloaded through the loading/unloading port by pallet changer 23, and at the time of processing of small-lot products, workpiece W is loaded/unloaded from gull wing 38. As a result, the loading/unloading operation corresponding to the lot size can be performed. It is noted that a reference sign 75 represents a control panel for a user to input a processing condition and the like, a reference sign 76 represents a foot switch for controlling opening/closing of gull wing 38, and a reference sign 70 represents a control panel for mainly performing the operation of pallet changer 23.

Figure 4:
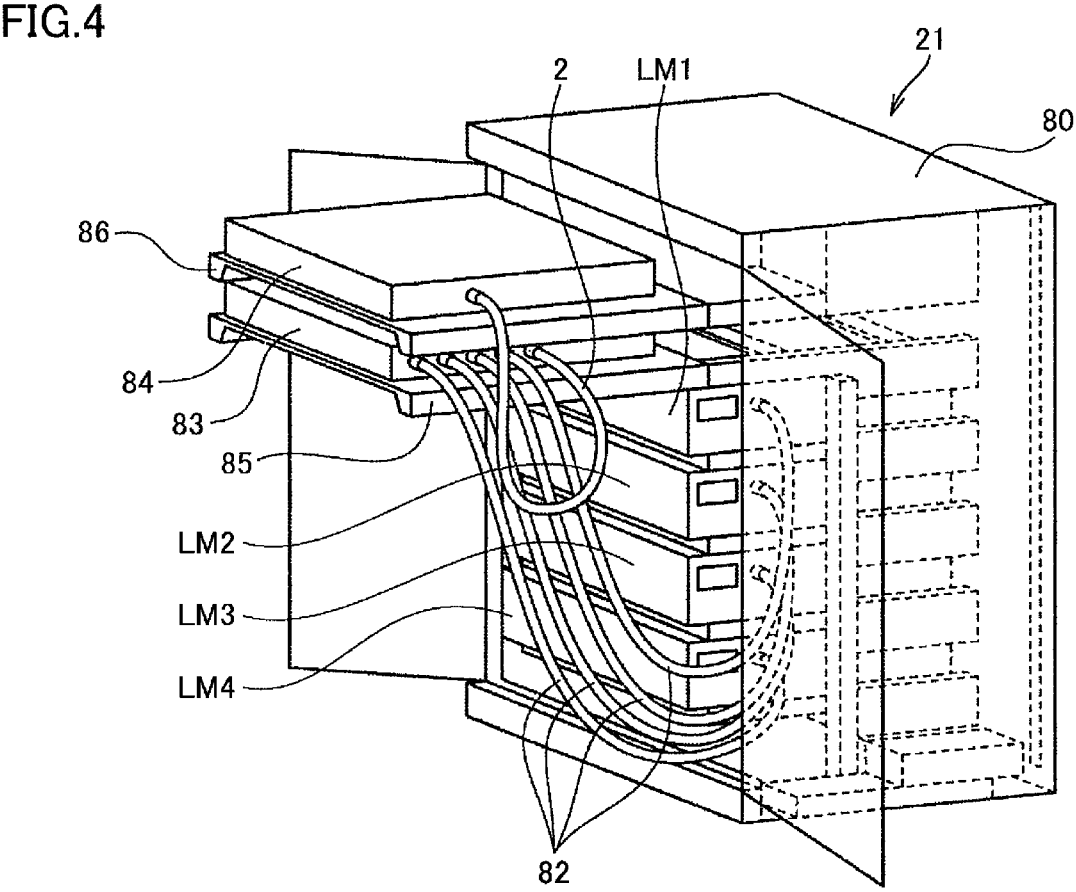
FIG. 4 is a perspective view showing a state in which a door of a laser oscillator is opened and a combiner table and a fusion table are drawn out.

A concave oscillator housing portion 30a that houses laser oscillator 21 is arranged at a substantially central portion of a right side surface 30R of cabin 30. As shown in FIG. 4, laser oscillator 21 arranged in this oscillator housing portion 30a is configured such that, in a box-type casing 80, a plurality of (four in the present embodiment) fiber laser modules LM1 to LM4 for generating laser beams are vertically stacked and housed, and a combiner 83 having an output cable 82 from each fiber laser module LM1 to LM4 connected thereto is housed above fiber laser modules LM1 to LM4. Furthermore, a fusion box 84 connected to combiner 83 by a feeding fiber cable 2 is housed above combiner 83. Process fiber cable 3 connecting to processing head 40 is inserted into fusion box 84 on the opposite side of the side into which feeding fiber cable 2 is inserted, and feeding fiber cable 2 and process fiber cable 3 are fused. Combiner 83 and fusion box 84 are arranged on a combiner table 85 and a fusion table 86 that can be drawn out from casing 80, respectively. As described above, in laser oscillator 21, output cables 82 of the plurality of fiber laser modules LM1 to LM4 are bundled in combiner 83, and the laser beams are guided to processing head 40 by feeding fiber cable 2 and process fiber cable 3.

Control device 22 arranged adjacent to laser oscillator 21 controls the whole of fiber laser processing machine 10.

<Functional Block Diagram>

Figure 6:
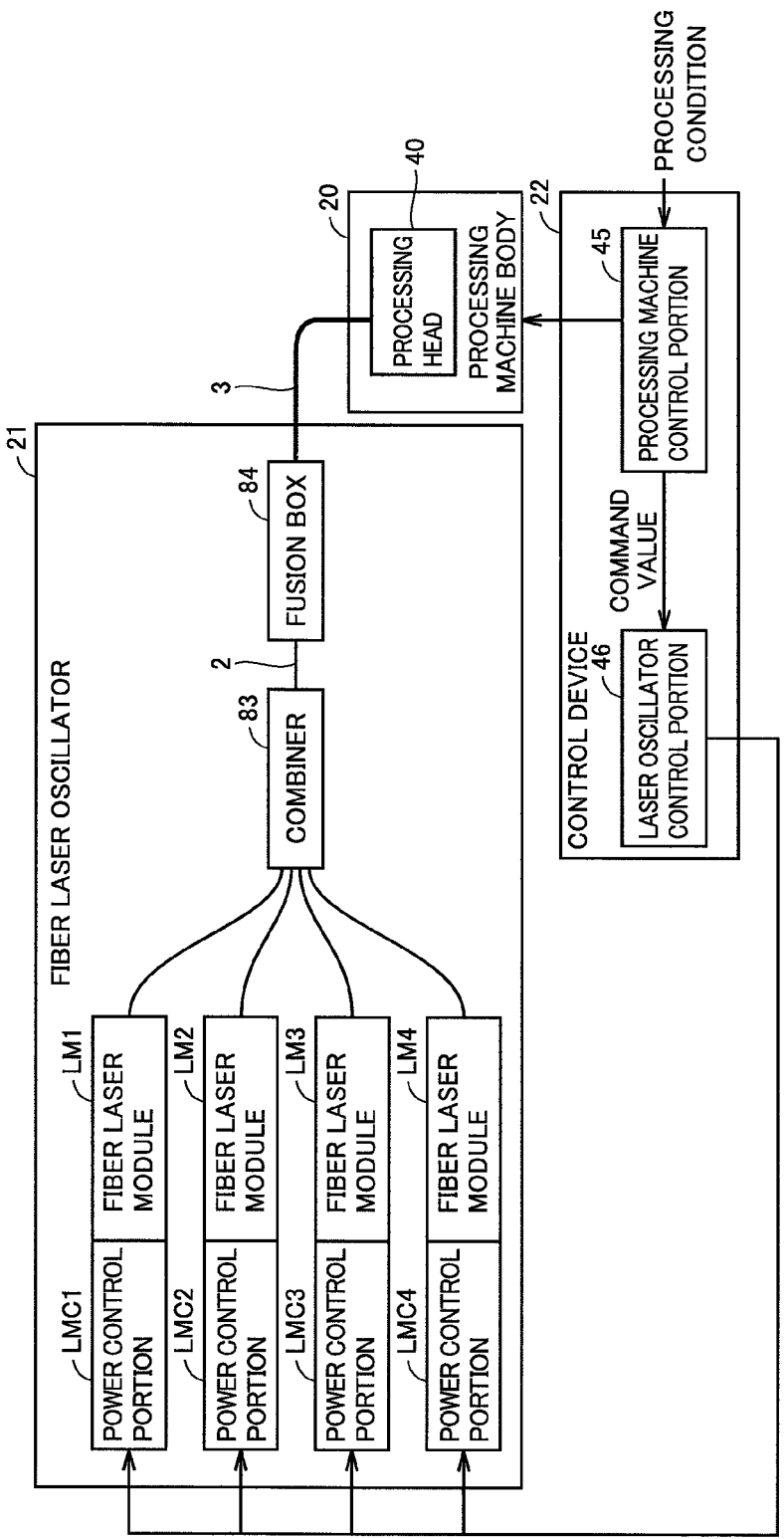
FIG. 6 is a view describing functional blocks of a fiber laser processing machine 10 based on the present embodiment.

FIG. 6 is a view describing functional blocks of fiber laser processing machine 10 based on the present embodiment.

As shown in FIG. 6, fiber laser processing machine 10 mainly includes processing machine body 20, fiber laser oscillator 21 and control device 22.

Processing machine body 20 includes processing head 40.

Fiber laser oscillator 21 includes the plurality of fiber laser modules LM1 to LM4, power control portions LMC1 to LMC4 provided to correspond to the plurality of fiber laser modules LM1 to LM4, respectively, combiner 83, and fusion box 84.

Power control portions LMC1 to LMC4 control powers of corresponding fiber laser modules LM1 to LM4 in accordance with an instruction from control device 22.

Combiner 83 combines a plurality of laser beams output by fiber laser modules LM1 to LM4, and outputs the combined laser beams to feeding fiber cable 2.

In fusion box 84, feeding fiber cable 2 and process fiber cable 3 are fused, and the combined laser beams are guided through process fiber cable 3 to processing head 40 of processing machine body 20.

Control device 22 includes a laser oscillator control portion 46 and a processing machine control portion 45.

When accepting an input of the processing condition such as a plate thickness, a material and the speed of a workpiece to be processed to control panel 75 from the user, processing machine control portion 45 controls processing machine body 20 based on this input. Based on this input, processing machine control portion 45 also outputs a command value such as an optimum laser command power to laser oscillator control portion 46.

Based on the command value from processing machine control portion 45, laser oscillator control portion 46 controls oscillation of fiber laser modules LM1 to LM4, and thereby, controls the power of the laser beam generated from laser oscillator 21.

Unlike the conventional control method, control device 22 of the present invention can control the number of oscillated fiber laser modules LM1 to LM4.

Control device 22 of the present invention can also execute control to produce a difference in power among fiber laser modules LM1 to LM4.

Figure 7:
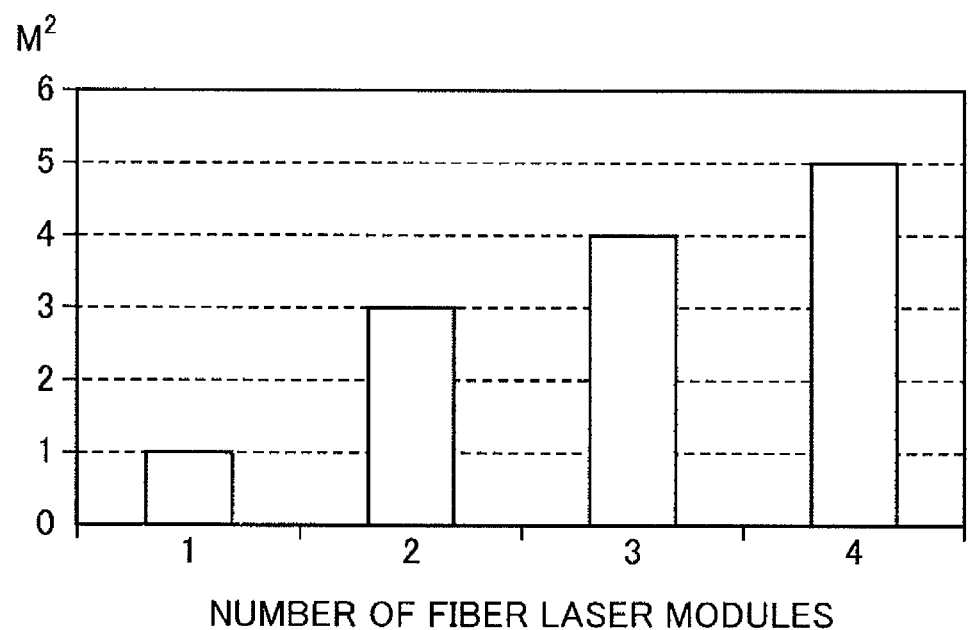
FIG. 7 is a view describing a relationship between the number of fiber laser modules and the $M^2$ value of a laser beam.

FIG. 7 is a view describing a relationship between the number of the fiber laser modules and the $M^2$ value of the laser beam.

As shown in FIG. 7, the $M^2$ value of the single-mode laser beam of each of fiber laser modules LM1 to LM4 is approximately 1, and the $M^2$ value of the multimode laser beam of four fiber laser modules LM1 to LM4 is approximately 5. The $M^2$ value of the multimode laser beam when two or three of four fiber laser modules LM1 to LM4 are oscillated is a value between approximately 1 and approximately 5.

For example, the laser oscillator of 2000 W on which four fiber laser modules LM1 to LM4 of 500 W are mounted will be taken as an example and a difference between the control method of the present invention and the conventional control method will be described.

In the conventional control method, when a total laser command power was 120 W, 600 W, 1200 W, and 1800 W, a laser command power was set at 30 W, 150 W, 300 W, and 450 W, respectively, such that all fiber laser modules LM1 to LM4 had the same power, as shown in Table 1. In other words, only the operation in the multimode in which all fiber laser modules LM1 to LM4 are oscillated was possible, and the $M^2$ value of the laser beam was a fixed value of approximately 5.

TABLE 1

| Laser Module | Laser Command Power | | | |
| --- | --- | --- | --- | --- |
| | 120 W | 600 W | 1200 W | 1800 W |
| LM1 | 30 W | 150 W | 300 W | 450 W |
| LM2 | 30 W | 150 W | 300 W | 450 W |
| LM3 | 30 W | 150 W | 300 W | 450 W |
| LM4 | 30 W | 150 W | 300 W | 450 W |

In contrast, in the control method of the present invention, the number of oscillated fiber laser modules LM1 to LM4 can be restricted when the total laser command power is equal to or smaller than a prescribed power. For example, as shown in Table 2, when the total laser command power is 50 W to 500 W, the number of oscillated fiber laser modules LM1 to LM4 is one, e.g., only fiber laser module LM1 is oscillated. When the total laser command power is 500 W to 1000 W, the number of oscillated fiber laser modules LM1 to LM4 is two, e.g., only fiber laser modules LM1 and LM2 are oscillated. When the total laser command power is 1000 W to 1500 W, the number of oscillated fiber laser modules LM1 to LM4 is three, e.g., only fiber laser modules LM1 to LM3 are oscillated. When the total laser command power is 1500 to 2000 W, the number of oscillated fiber laser modules LM1 to LM4 is four, i.e., all fiber laser modules LM1 to LM4 are oscillated. As described above, in the control method of the present invention, the operation in the single mode and the operation in the multimode are possible. Furthermore, in the operation in the multimode as well, the number of oscillated fiber laser modules LM1 to LM4 can be controlled.

TABLE 2

| Laser Module | Laser Command Power | | | |
| --- | --- | --- | --- | --- |
| | 50 W~ 500 W | 500 W~ 1000 W | 1000 W~ 1500 W | 1500 W~ 2000 W |
| LM1 | Y | Y | Y | Y |
| LM2 | N | Y | Y | Y |
| LM3 | N | N | Y | Y |
| LM4 | N | N | N | Y |

In Table 2, Y represents "oscillated", and N represents "stopped".

Table 3 shows one example of the power setting when the total laser command power is 120 W, 600 W, 1200 W, and 1800 W in the control method of the present invention.

TABLE 3

| Laser Module | Laser Command Power | | | |
| --- | --- | --- | --- | --- |
| | 120 W | 600 W | 1200 W | 1800 W |
| LM1 | 120 W | 500 W | 500 W | 500 W |
| LM2 | N | 100 W | 500 W | 500 W |
| LM3 | N | N | 200 W | 500 W |
| LM4 | N | N | N | 300 W |

In Table 3, N represents "stopped".

The laser command power shown in Table 3 is one example, and oscillated fiber laser modules LM1 to LM4 may be changed, or oscillated fiber laser modules LM1 to LM4 may be the same in power, or the powers may be set to have values different from those in Table 3. As described above, the powers of oscillated fiber laser modules LM1 to LM4 can be made different from one another, and thus, the degree of freedom of power setting is enhanced.

In the control method of the present invention, the number of oscillated fiber laser modules LM1 to LM4 is changed, and thereby, the beam quality called "$M^2$ value" can be changed and thus spot diameter w can be changed. Namely, the $M^2$ value of the laser beam becomes approximately 1 when only one of fiber laser modules LM1 to LM4 is oscillated, and the $M^2$ value of the laser beam becomes approximately 5 when four fiber laser modules LM1 to LM4 are oscillated, and the $M^2$ value of the laser beam becomes a value between approximately 1 and approximately 5 when two or three of four fiber laser modules LM1 to LM4 are oscillated. In the conventional control method, the $M^2$ value was constantly a fixed value, and thus, the condenser lens had to be replaced to change spot diameter ω. However, in the control method of the present invention, spot diameter ω can be changed by changing the $M^2$ value, and thus, the operation of replacing the condenser lens to change spot diameter ω can be omitted. In addition, the number of oscillated fiber laser modules LM1 to LM4 is restricted when the total laser command power is equal to or smaller than the prescribed power. Therefore, the unstable power caused by the small power of each of fiber laser modules LM1 to LM4 can be avoided and stable processing can be achieved.

<Flowchart>

A flowchart for implementing the aforementioned process will be described.

Figure 8:
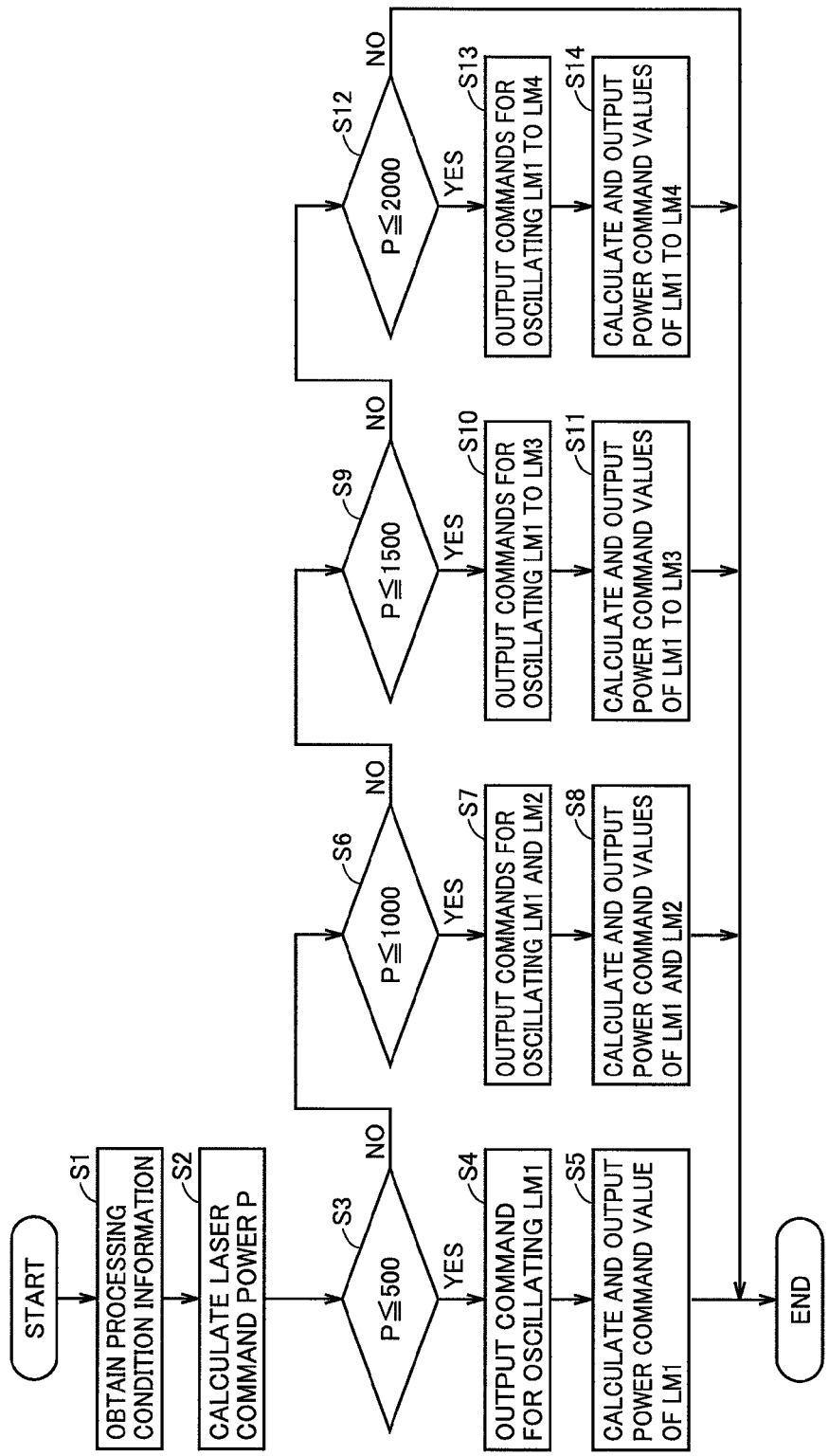
FIG. 8 is a flowchart describing a control process for a fiber laser oscillator 21 in a control device 22 of the present invention.

FIG. 8 is a flowchart describing a control process for fiber laser oscillator 21 in control device 22 of the present invention. This process is executed mainly in processing machine control portion 45.

Referring to FIG. 8, the processing condition is obtained (step S1). Specifically, processing machine control portion 45 accepts an input of the processing condition to control panel 75 and obtains the processing condition information Next, based on the obtained processing condition information, processing machine control portion 45 calculates a laser command power P in fiber laser oscillator 21 (step S2).

This laser command power P can be calculated based on a prescribed arithmetic equation, in accordance with the processing condition and the like such as a plate thickness, a material and the speed of a workpiece to be processed.

Then, processing machine control portion 45 determines whether laser command power P is equal to or smaller than 500 (step S3).

If processing machine control portion 45 determines in step S3 that laser command power P is equal to or smaller than 500 (YES in step S3), processing machine control portion 45 outputs, to fiber laser module LM1, a command to oscillate and output the laser beam (step S4).

Then, processing machine control portion 45 calculates and outputs a power command value of fiber laser module LM1 (step S5).

Then, the process ends (end).

If processing machine control portion 45 determines in step S3 that laser command power P is not equal to or smaller than 500 (NO in step S3), processing machine control portion 45 determines whether laser command power P is equal to or smaller than 1000 (step S6).

If processing machine control portion 45 determines in step S6 that laser command power P is equal to or smaller than 1000 (YES in step S6), processing machine control portion 45 outputs, to fiber laser modules LM1 and LM2, a command to oscillate and output the laser beam (step S7).

Then, processing machine control portion 45 calculates and outputs power command values of fiber laser modules LM1 and LM2 (step S8).

Then, the process ends (end).

If processing machine control portion 45 determines in step S6 that laser command power P is not equal to or smaller than 1000 (NO in step S6), processing machine control portion 45 determines whether laser command power P is equal to or smaller than 1500 (step S9).

If processing machine control portion 45 determines in step S9 that laser command power P is equal to or smaller than 1500 (YES in step S9), processing machine control portion 45 outputs, to fiber laser modules LM1 to LM3, a command to oscillate and output the laser beam (step S10).

Then, processing machine control portion 45 calculates and outputs power command values of fiber laser modules LM1 to LM3 (step S11).

Then, the process ends (end).

If processing machine control portion 45 determines in step S9 that laser command power P is not equal to or smaller than 1500 (NO in step S9), processing machine control portion 45 determines whether laser command power P is equal to or smaller than 2000 (step S12).

If processing machine control portion 45 determines in step S12 that laser command power P is equal to or smaller than 2000 (YES in step S12), processing machine control portion 45 outputs, to fiber laser modules LM1 to LM4, a command to oscillate and output the laser beam (step S13).

Then, processing machine control portion 45 calculates and outputs power command values of fiber laser modules LM1 to LM4 (step S14).

Then, the process ends (end).

On the other hand, if processing machine control portion 45 determines in step S12 that laser command power P is not equal to or smaller than 2000 (NO in step S12), the process ends (end) because a power limit value is exceeded.

With this process, the number of oscillated fiber laser modules LM1 to LM4 can be restricted when the total laser command power is equal to or smaller than the prescribed power, for example.

Figure 9:
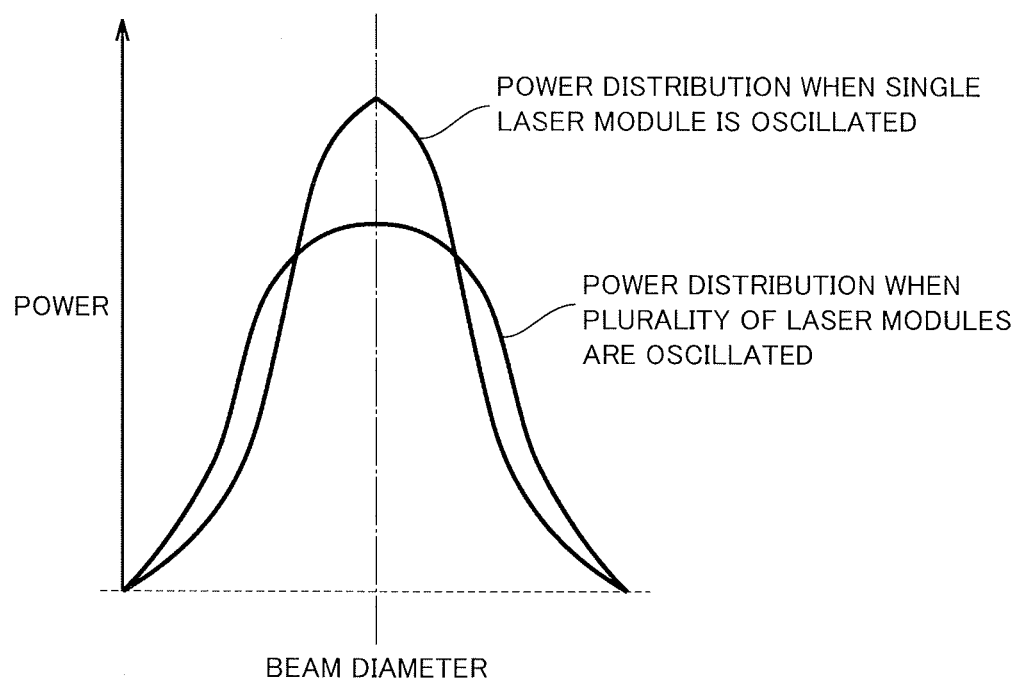
FIG. 9 is a graph showing power distributions of a beam incident to a condenser lens when a single laser module is oscillated at the same power and when a plurality of laser modules are oscillated at the same power.
Figure 10:
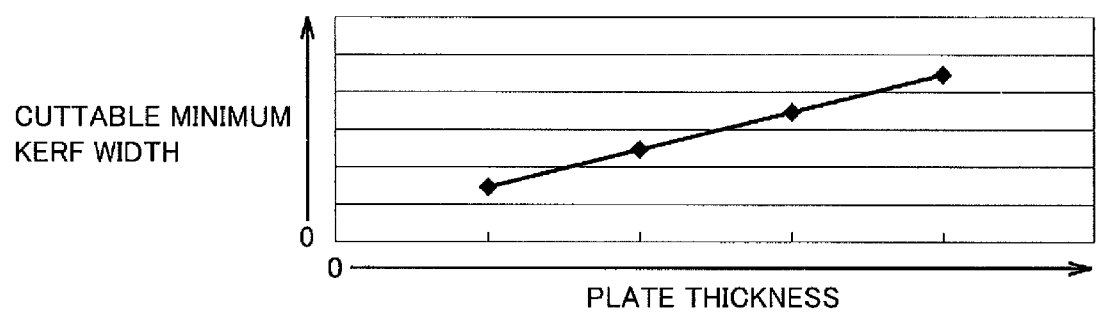
FIG. 10 is a graph showing a relationship between a cuttable cutting groove width (kerf width) and a plate thickness.

FIG. 9 is a graph showing power distributions of the beam incident to the condenser lens when a single laser module is oscillated at the same power and when a plurality of laser modules are oscillated at the same power.

As shown in FIG. 9, it can be seen that the beam goes into the single mode when the single laser module is oscillated, and the beam goes into the multimode when the plurality of laser modules are oscillated.

By using this property, when higher cutting speed is desired, the number of oscillated fiber laser modules LM1 to LM4 is reduced, and thus, even at the same power, the power density can be increased by decreasing the spot diameter. Therefore, an increase in cutting speed can be achieved and high-precision processing can be performed. Accordingly, by selecting the optimum $M^2$ value in accordance with the processing shape of a workpiece to be processed, e.g., an acute-angled portion, a curved portion, a straight portion and the like, optimum processing can be performed. In addition, as described with reference to FIG. 7, when the plate thickness of workpiece W to be processed is thin, the cutting groove width at which the maximum cutting speed is obtained becomes narrow. Therefore, by reducing the number of oscillated fiber laser modules LM1 to LM4 and decreasing spot diameter ω, higher-precision processing than the conventional art becomes possible.

Furthermore, in the case of marking-off processing (engraving on a surface of a material), for example, processing at the small power is required. In the operation in the multimode as in the conventional control method, oscillation is not stabilized at the small power and thus high-precision processing is difficult. However, in the control method of the present invention, the operation in the single mode is also possible. Therefore, the power of one laser module is not so small even though the power is small, and thus, stable processing can be achieved.

EXAMPLE

The effect of the present invention will be described hereinafter by way of Example and Comparative Example.

The following are settings when a laser processing machine of 2 kW of the present invention (Example) and a conventional laser processing machine of 2 kW (Comparative Example) are used to laser-cut a soft steel having a plate thickness of 12 mm and a soft steel having a plate thickness of 1.6 mm.

Example (a) soft steel having a plate thickness of 12 mm
laser wavelength: λ=1.06 μm
beam quality: $M^2$=5
focal length of condenser lens: f=200 mm
incident beam diameter: D=15 mm
spot diameter: ω=90 μm
power: P=2000 W
power density: PD=(2000×4)/(90×90×π)=0.314 W/μm$^2$
cutting speed: F=900 mm/min
(b) soft steel having a plate thickness of 1.6 mm
laser wavelength: λ=1.06 μm
beam quality: $M^2$=1.1
focal length of condenser lens: f=200 mm
incident beam diameter: D=15 mm
spot diameter: ω=19.7 μm
power: P=500 W
power density: PD=(500×4)/(19.7×19.7×π)=1.64 W/μm$^2$
cutting speed: F=8000 mm/min Comparative Example (a) soft steel having a plate thickness of 12 mm
laser wavelength: λ=1.06 μm
beam quality: $M^2$=5
focal length of condenser lens: f=200 mm
incident beam diameter: D=15 mm
spot diameter: ω=90 m
power: P=2000 W
power density: PD=(2000×4)/(90×90×π)=0.314 W/μm$^2$
cutting speed: F=900 mm/min
(b) soft steel having a plate thickness of 1.6 mm
laser wavelength: λ=1.06 μm
beam quality: $M^2$=5
focal length of condenser lens: f=125 mm
incident beam diameter: D=15 mm
spot diameter: ω=56 μm
power: P=2000 W
power density: PD=(2000×4)/(56×56×π)=0.812 W/μm$^2$
cutting speed: F=4000 mm/min In the setting of Comparative Example in which the conventional laser processing machine of 2 kW is used, the focal length of the condenser lens is changed to perform switching between thin plate cutting (1.6 mm) and thick plate cutting (12 mm). In contrast, in the setting of Example in which the laser processing machine of 2 kW of the present invention is used, the focal length of the condenser lens is fixed (here, f=200 mm), and cutting is performed at 500 W×4=2000 W at the time of thick plate cutting (12 mm) similarly to the conventional art, whereas cutting is performed by the single module of 500 W at the time of thin plate cutting (1.6 mm).

As a result, at the time of thin plate cutting (1.6 mm), the single module is used, and thus, the beam quality is good, and power density PD is high and consequently cutting speed F is high, although the power is 500 W which is lower than that in the conventional art. Therefore, when a workpiece having the same plate thickness of 1.6 mm is cut, power P is reduced from 2000 W to 500 W, i.e., reduced to a quarter, and the electric power consumed in the oscillator is also reduced to a quarter. In addition, cutting speed F can also be increased from 4000 mm/min to 8000 mm/min and cutting can be performed at twice the speed, and thus, the cutting time is reduced to a half of that in the conventional art. Therefore, in combination with the low power of the oscillator, the running cost is reduced to one-eighth of that in the conventional art.

As described above, according to the control method of the present invention, by controlling the number of oscillated fiber laser modules LM1 to LM4, the beam quality called "$M^2$ value" can be changed, and thus, spot diameter ω can be changed. Therefore, the number of replacement of the condenser lens which was conventionally required can be reduced or replacement can be eliminated, and thus, the workability can be enhanced. In addition, lower power of the oscillator, a reduction in cutting time caused by higher cutting speed, and a reduction in running cost become possible.

It is noted that the present invention is not limited to the aforementioned embodiment, and variation, modification or the like is possible as appropriate.

For example, the number of the fiber laser modules included in laser oscillator 21 is not limited to four, and any number is possible as long as at least two or more fiber laser modules are included in laser oscillator 21.

While the embodiment of the present invention has been described above, it should be understood that the embodiment disclosed herein is illustrative and not limitative in any respect. The scope of the present invention is defined by the terms of the claims, and is intended to include any modifications within the scope and meaning equivalent to the terms of the claims.

REFERENCE SIGNS LIST 2 feeding fiber cable; 3 process fiber cable; 10 fiber laser processing machine; 20 processing machine body; 21 fiber laser oscillator; 22 control device; 23 pallet changer; 24 booster compressor; 25 air compressor; 26 oxygen gas cylinder; 27 assist gas supply portion; 28 chiller unit; 29 dust collector; 30 cabin; 30B rear surface; 30F front surface; 30R right side surface; 30a oscillator housing portion; 31 pallet; 32 pallet drive mechanism; 38 gull wing; 40 laser processing head; 45 processing machine control portion; 46 laser oscillator control portion; 49 processing head drive mechanism; 51 collimator lens; 52 condenser lens; 70, 75 control panel; 76 foot switch; 80 casing; 82 output cable; 83 combiner; 84 fusion box; 85 combiner table; 86 fusion table.

The invention claimed is:

1. A power control method for a fiber laser processing machine comprising: a fiber laser oscillator having a plurality of fiber laser modules each of which generates a laser beam; a laser processing head for emitting the laser beam generated from said fiber laser oscillator; a condenser lens with a prescribed focal length provided between a workpiece and said laser processing head, for irradiating said workpiece with the laser beam having a spot diameter output from said laser processing head; and an assist gas supply portion for blowing away molten material from the workpiece, wherein the number of said plurality of fiber laser modules oscillated is adjusted so as to achieve the spot diameter corresponding to a thickness of the workpiece and a pressure of the assist gas, and thereby, a beam quality indicated by an M square value from said laser processing head is adjusted.

2. The power control method for a fiber laser processing machine according to claim 1, wherein as compared with the number of said fiber laser modules oscillated at the time of cutting a workpiece having a prescribed plate thickness, the number of said fiber laser modules oscillated at the time of cutting a workpiece having a plate thickness thinner than said prescribed plate thickness is set to be smaller.

3. The power control method for a fiber laser processing machine according to claim 1, wherein
as compared with the number of said fiber laser modules oscillated at the time of cutting at a prescribed speed, the number of said fiber laser modules oscillated at the time of cutting at a speed higher than said prescribed speed is set to be smaller.

4. The power control method for a fiber laser processing machine according to claim 1, wherein
the number of said fiber laser modules oscillated is restricted when a total laser command power is equal to or smaller than a prescribed power.

5. The power control method for a fiber laser processing machine according to claim 1, wherein
powers of said plurality of fiber laser modules are made different from one another.

6. A fiber laser processing machine, comprising:
a fiber laser oscillator having a plurality of fiber laser modules each of which generates a laser beam;
a laser processing head for emitting the laser beam generated from said fiber laser oscillator;
a condenser lens with a prescribed focal length provided between a workpiece and said laser processing head, for irradiating said workpiece with the laser beam having a spot diameter output from said laser processing head;
an assist gas supply portion for blowing away molten material from the workpiece; and
a control device capable of adjusting a beam quality indicated by an M square value from said laser processing head in accordance with the number of said plurality of fiber laser modules oscillated, wherein
said control device adjusts the number of said plurality of fiber laser modules oscillated so as to achieve the spot diameter corresponding to a thickness of the workpiece and a pressure of the assist gas.

7. The fiber laser processing machine according to claim 6, wherein
as compared with the number of said fiber laser modules oscillated at the time of cutting a workpiece having a prescribed plate thickness, said control device sets to be smaller the number of said fiber laser modules oscillated at the time of cutting a workpiece having a plate thickness thinner than said prescribed plate thickness.

8. The fiber laser processing machine according to claim 6, wherein
as compared with the number of said fiber laser modules oscillated at the time of cutting at a prescribed speed, said control device sets to be smaller the number of said fiber laser modules oscillated at the time of cutting at a speed higher than said prescribed speed.

9. The fiber laser processing machine according to claim 6, wherein
said control device restricts the number of said fiber laser modules oscillated, when a total laser command power is equal to or smaller than a prescribed power.

10. The fiber laser processing machine according to claim 6, wherein
said control device executes control to make powers of said plurality of fiber laser modules different from one another.

* * * * *